United States Patent
Bonanno et al.

(10) Patent No.: US 6,938,151 B2
(45) Date of Patent: Aug. 30, 2005

(54) HYBRID BRANCH PREDICTION USING A GLOBAL SELECTION COUNTER AND A PREDICTION METHOD COMPARISON TABLE

(75) Inventors: James J. Bonanno, Wappingers Falls, NY (US); Nidhi Nijhawan, Madison, WI (US); Brian R. Prasky, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 473 days.

(21) Appl. No.: 10/161,857

(22) Filed: Jun. 4, 2002

(65) Prior Publication Data

US 2004/0225872 A1 Nov. 11, 2004

(51) Int. Cl.⁷ .................................................. G06F 9/32
(52) U.S. Cl. ........................................................ 712/239
(58) Field of Search ........................................... 712/239

(56) References Cited

U.S. PATENT DOCUMENTS

| | | | | |
|---|---|---|---|---|
| 5,758,142 A | * | 5/1998 | McFarling et al. | 712/239 |
| 6,550,004 B1 | * | 4/2003 | Henry et al. | 712/239 |
| 6,604,190 B1 | * | 8/2003 | Tran | 712/207 |
| 6,738,897 B1 | * | 5/2004 | Talcott | 712/240 |
| 6,792,524 B1 | * | 9/2004 | Peterson et al. | 712/235 |

* cited by examiner

*Primary Examiner*—Eric Coleman
(74) *Attorney, Agent, or Firm*—Lynn L. Augspurger

(57) ABSTRACT

A microprocessor and method for branch prediction selection provides the capability to select among multiple direction based history arrays for a single branch. A global selection counter when used in conjunction with a Prediction Method Comparison Table (PMCT) allows for branch direction accuracy to be improved on cold starts and context switches while maintaining high accuracy on long running code while minimizing silicon area and reducing power requirements.

16 Claims, 6 Drawing Sheets

Transition 0: Bimodal better
Transition 1: Gshare better

HYBRID BRANCH PREDICTION USING A GLOBAL SELECTION COUNTER AND A PREDICTION METHOD COMPARISON TABLE

FIELD OF THE INVENTION

The present invention relates generally to computer processing systems and, in particular, to a method and apparatus for predicting branch direction in a computer processing system.

TRADEMARKS

IBM is a registered trademarks of International Business Machines Corporation, Armonk, N.Y., U.S.A. Other names may be registered trademarks or product names of International Business Machines Corporation or other companies.

BACKGROUND

A basic pipeline microarchitecture of a microprocessor processes one instruction at a time. The basic dataflow for an instruction is: instruction fetch, decode, cache access, execute, and result write back. Each stage within the pipeline must occur in order and hence a given stage can not progress unless the stage in front of it is progressing. In order to achieve highest performance, one instruction will enter the pipeline every cycle. Whenever the pipeline has to be delayed or cleared, this adds latency which in turns can be monitored by the time it takes a microprocessor to carry out a given task.

There are many dependencies between instructions which prevent the optimal case of a new instruction entering the pipe every cycle. These dependencies add latency to the pipe. One category of latency contribution deals with branches. A branch is an instruction which can either fall though to the next sequential instruction, not taken, or branch off to another instruction address, taken, and carry out execution of a different series of code. At decode time, the branch is detected, and must wait to be resolved in order to know the proper direction the instruction stream is to proceed. By waiting for potentially multiple pipeline stages for the branch to resolve the direction to proceed, adds latency into the pipeline. To overcome the latency of waiting for the branch to resolve, the direction of the branch can be predicted such that the pipe begins decoding either down the taken or not taken path. At branch resolution time, the guessed direction is compared to the actual direction the branch was to take. If the actual direction and the guessed direction are the same, then the latency of waiting for the branch to resolve has been removed from the pipeline in this scenario. If the actual and predicted direction are not equivalent, then decoding proceeded down the improper path and all instructions in this path behind that of the improperly guessed direction of the branch must be flushed out of the pipe, and the pipe must be restarted at the correct instruction address to begin decoding the actual path of the given branch. Because of the controls involved with flushing the pipe and beginning over, there is a penalty associated with the improper guess and latency is added into the pipe over simply waiting for the branch to resolve before decoding further. By having a high rate of correctly guessed paths, the ability to remove latency from the pipe by guessing the correct direction out weighs the latency added to the pipe for guessing the direction incorrectly.

In order to improve the accuracy of the guess associated with the guess of a branch, a Branch History Table (BHT) can be implemented which allows for direction guessing of a branch based on the past behavior of the direction the branch previously went. If the branch is always taken, as is the case of a subroutine return, then the branch will always be guessed taken. IF/THEN/ELSE structures become more complex in their behavior. A branch may be always taken, sometimes taken and not taken, or always not taken. Based on the implementation of dynamic branch prediction, it will determine how the BHT predicts the direction of the branch.

There are many concepts that can be applied to create algorithms for dynamically predicting the direction that a branch is to take. Some of the most common to date include keeping a 2 bit saturated counter for a range of entries. Each counter has 4 states which is typically encoded as 00: strongly not take, 01: weakly not taken, 10: weakly taken, 11: strongly taken. When a branch is either strongly not taken or weakly not taken and the branch is resolved not taken, then the state becomes strongly not taken. The inverse also applies where if the branch is weakly or strongly guessed taken and the branch is resolved as taken, then the state becomes strongly taken. If the guessed direction is different from that of the direction the branch is resolved, then the state moves in the inverse direction. In general if the branch is guessed strongly not taken, then the state becomes weakly not taken. If the branch is guessed weakly not taken, the state becomes weakly taken. If the guess is strongly taken, the state becomes weakly taken and if the guess was weakly taken, the state becomes weakly not taken. In general, a table of these counters is created and the way the table is indexed can have many schemes and profound differences on prediction accuracy. For branches which close off loops, the prediction will be correct $(X-1)/X$ amount of the time where X is the times the loop is processed. An addressing scheme of the branch instruction address into the table works very well in such a situation. In the cases of IF/THEN/ELSE structures where the direction has a higher level of conditional based information, a scheme of using instruction addresses as an entry point into the table does not work with the same level of accuracy. In such circumstances, determining where the branch occurs and XORing the pattern of the direction of the last 'N' branches provides a higher level of accuracy. Other schemes include having multiple branch prediction tables for sets of branches based on the type of branch, for example Branch and Link, Branch on Count, or Branch on Condition.

In order to take advantage of the increased accuracy multiple prediction tables can provide, there needs to be a method for selecting which of the tables will be used for predicting the direction of a given branch. The standard method of selection involves having one additional array table of equal size to the number of entries that are stored in the branch history tables and pattern history tables. The number of additional selection arrays goes up as additional direction prediction based arrays are added.

There have been many methods to improve branch prediction accuracy which include those patents discussed below; however, while they deal with prediction accuracy, they don't additionally account for area, power, and context switches. U.S. Pat. No. 5,935,241—"Multiple Global Pattern History Tables for Branch Prediction in a Microprocessor" targets selecting between multiple history predictors based on selection of microprocessor state including user privilege (supervisor state versus user state). U.S. Pat. No. 6,272,623—"Methods and Apparatus for Branch Prediction using Hybrid History with Index Sharing" targets using global and local history to select a branch prediction from a single prediction table.

SUMMARY OF THE INVENTION

In accordance with the preferred embodiment of the invention we have provided a method for selecting a predicted direction of a branch from multiple prediction tables in a microprocessor which provides the ability to predict branches and which method includes: (a) indexing an array based on the address of a branch; (b) indexing an array with the aid of a global history register; (c) using a global selection counter to select between multiple predictors; and the method of prediction makes use of a prediction method comparison table (PMCT) to override the selection of the global selection counter. The method determines for a given time frame the best direction prediction method to use. A selection that is based on global prediction provides results determined by the potentially speculative path the processor is decoding down. In certain scenarios, there are advantages to not selecting the direction predictor based on global history, but rather noting a particular branch to have its selection mechanism based on another scheme which has an accuracy that is superior to that of the global selection counter. The PMCT provides such a method of overriding the global selection counter and providing the optimal prediction table to use for predicting the direction of a given branch.

Furthermore, with the preferred embodiment predicting direction may be employed where unique branches are predicted more accurately with different types of prediction schemes. Through such a method, prediction accuracy around context switches increases, silicon area is reduced, power usage is decreased, and potential timing critical paths are removed. An achievement of the current invention it that it provides a way for essentially eliminating the need for the extra table for a small penalty in performance, or reducing this selection array by over ninety percent is size with only a minute penalty in performance. This embodiment provides a prediction accuracy similar to that of current schemes for a given thread while decreasing area by up to thirty percent, reducing power consumption, and improving prediction accuracy after context switches.

These and other aspects, features and advantages of the present invention will become apparent from the following detailed description of preferred embodiments, which is to be read in connection with the accompanying drawings. For a better understanding of the invention with advantages and features, refer to the description and to the drawings.

DESCRIPTION OF THE DRAWINGS

FIG. 5 illustrates PMCT states and transitions; while

Our detailed description explains the preferred embodiments of our invention, together with advantages and features, by way of example with reference to the drawings.

DETAILED DESCRIPTION OF THE INVENTION

The preferred embodiment of the present invention is directed to a method and apparatus for predicting directions of branches which are not constant in behavior. This method provides a high direction prediction accurate rate for a given silicon area and an improved prediction accuracy after context switches.

Figure 1:
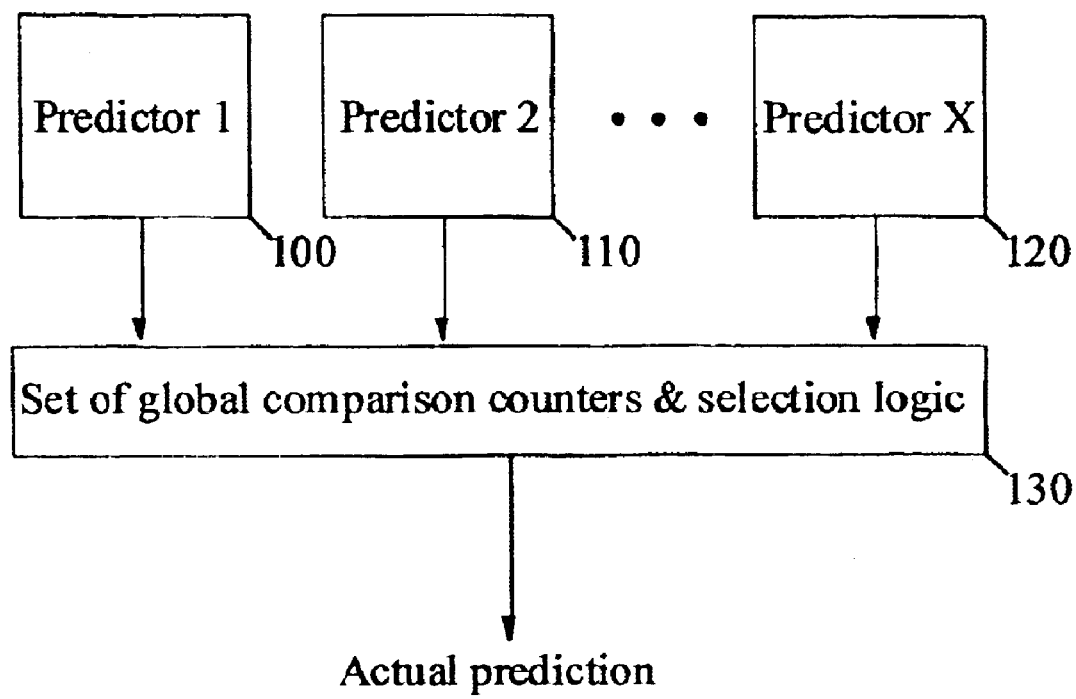
FIG. 1 illustrates a high level hybrid predictor using global selection counters.
Figure 2:
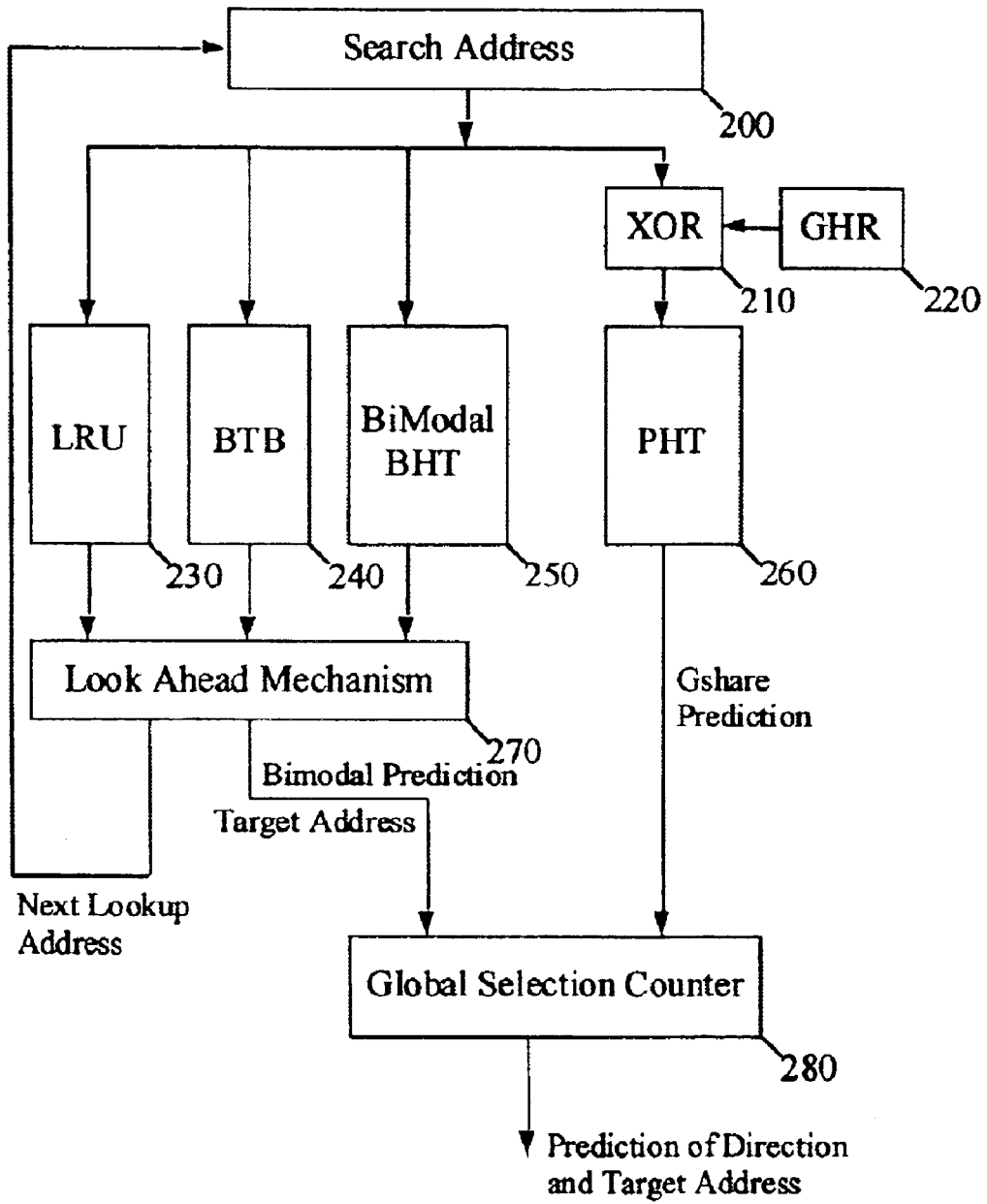
FIG. 2 illustrates a bimodal/gshare prediction scheme using a global selection counter.

With different branches behaving differently, there are different prediction methods which prove more beneficial in given circumstances. Upon a thread of code just beginning to run on a microprocessor, there is no past history present for a how a given branch will behave. In such circumstances we have determined that a branch history table with the ability to learn quickly, but perhaps, not as accurate as other methods has been needed. Referring to FIG. 2, one such example of such a scheme is a branch history table 250 where the lookup is based on a given instruction address of a given branch. Over time, patterns 220 of how this branch was reached and what sequence of branches was taken to reach the given branch, can be used to create a more appropriate lookup which will provide higher accuracy for predicting the direction of a given branch. While these are only two methods of creating lookups, it does demonstrate the need to be able to select between the FIG. 1 multiple tables 100 110 120 if branch history is to be predicted at an accuracy rate as high as possible. In order to minimize the amount of silicon area needed to perform the given logic, an implementation has been derived such that a selection table for each entry is not needed. While each branch predictor is better at certain situations, it is highly unlikely to be superior in the prediction of every branch entry. In such cases, the history table for direction prediction is not of relevance. To exemplify how the FIG. 1 global comparison counters 130 can be used, FIG. 2 provides a two predictor hybrid scheme using bimodal 250 (2-bit counter) and gshare 210 260 with a single n-bit global selection counter is described. Many of the details in the following discussion are specific to the example and those skilled in the art can easily substitute and/or add other hybrid prediction schemes with global selection counters.

Initially, the bimodal 250 predictor performs better than gshare 210 since gshare's pattern history table (PHT) 260 takes time to build itself up based on the history of executed branches. After some time, gshare can more effectively predict certain branches. In the proposed scheme, a choice between the two predictors is made dynamically based on the performance of the two schemes over the last 2^n branches 280. 'n' is the number of bits in size of the global selection counter. This scheme often yields a measurable performance gain over either prediction scheme used individually.

The example design maintains and updates a global branch history 220 used by the gshare predictor. Its updation is done speculatively because several dynamic predictions may take place before the corresponding branches are decoded and later resolved. The GHR 220 update process described below can deal with the fact that the look-ahead prediction mechanism 270 may not detect branches before they are decoded. This is one of many ways in which a global history can be updated.

For a bimodal Predictor, associated with each entry is a bimodal 2 bit history counter 250. This array of counters is called the Branch History Table (BHT). The counters are updated in accordance with the resolution of branch. When a branch is resolved taken, its counter is incremented. When a branch is resolved not taken, its counter is decremented. With the preferred embodiment of FIG. 6 which illustrates selection process of a branch's predicted direction, the bimodal prediction on that branch is "taken" 680 if the counter is in the 10 or 11 states. The prediction is "not taken" 670 if the counter is in the 00 or 01 states.

For a Gshare Predictor, the predictor consists of a Pattern History Table (PHT) 260 which is an array of 2-bit counters updated in the same way as the bimodal counters. The '1' bit global history register (GHR), used to keep the history of last '1' branches, is XORed with a bit field of the search address to index into the PHT. The gshare prediction therefore not only depends on the search address but also on the way the branch was reached (global history).

Figure 6:
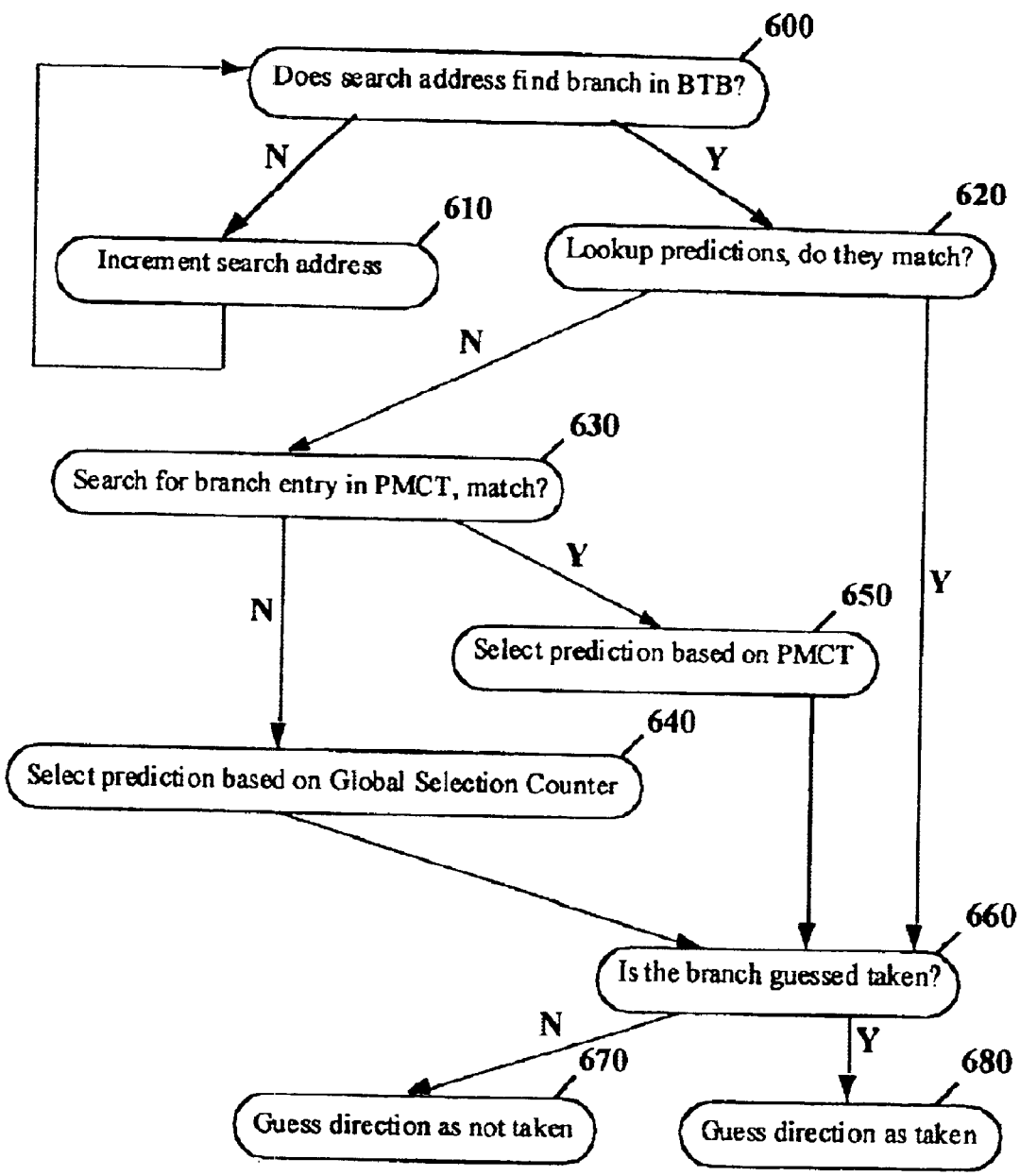
FIG. 6 illustrates selection process of a branch's predicted direction.

In traditional hybrid schemes one or more counters are associated with every entry in the branch prediction structure. The choice among the predictors is based on the predictors' history of effectiveness on that branch. However, as shown in FIG. 6 many branches are predicted equally well 620 by multiple predictors. Furthermore, the branches predicted more accurately by a particular method often show temporal locality, hence a global predictor selection scheme is nearly as effective while saving the resources usually allocated for maintaining separate selection structures for each branch entry.

The invention in its preferred embodiment dictates that global selection counters 130 dynamically determine which one of the predictors is used. If there are x predictors, x(x−1)/2 counters could be used to compare each predictor with every other one. The state of the counters determines which predictor to use. For the bimodal/gshare example, only one global comparison counter is needed. It is incremented every time a correct prediction was made by the gshare predictor and the bimodal predictor made an incorrect prediction. It is decremented every time bimodal made a correct prediction and gshare made an incorrect prediction. If both gshare and bimodal gave the same prediction, the counter is not changed. When the counter is above a fixed threshold, gshare is used to make predictions and when it is below the threshold, the bimodal predictor is used. This is how the 'n' bit global comparison counter 280 makes a selection based on the relative performance of the predictors over the last 2^n dynamically predicted branches. The global selection counter is updated when a dynamically predicted branch is resolved. The counter is used when a prediction is being made on a branch found by the look-ahead mechanism.

When a branch is encountered 600, as illustrated in FIG. 6, the two predictors make their predictions simultaneously 620. Depending upon the value of the global selection counter, one of the predictions is used. Upon resolution of the branch; however, both predictors update their prediction counters-accordingly along with the last register used LRU 230 associated with the branch target buffer (BTB) 240 entry. The target address predicted from the branch target buffer (BTB) 240 is used for look-ahead if the branch is predicted taken, otherwise the branch's fall through address is used. The look-ahead mechanism continues with the predicted target 200 to search 610 for the next branch in the BTB 240. When a subsequent branch is found, illustrated by FIG. 6, the new prediction 660 is made depending upon the selection counter. This process continues until either an unexpected resolved taken branch is encountered, or one of the dynamic predictions is determined to be incorrect.

Figure 3:
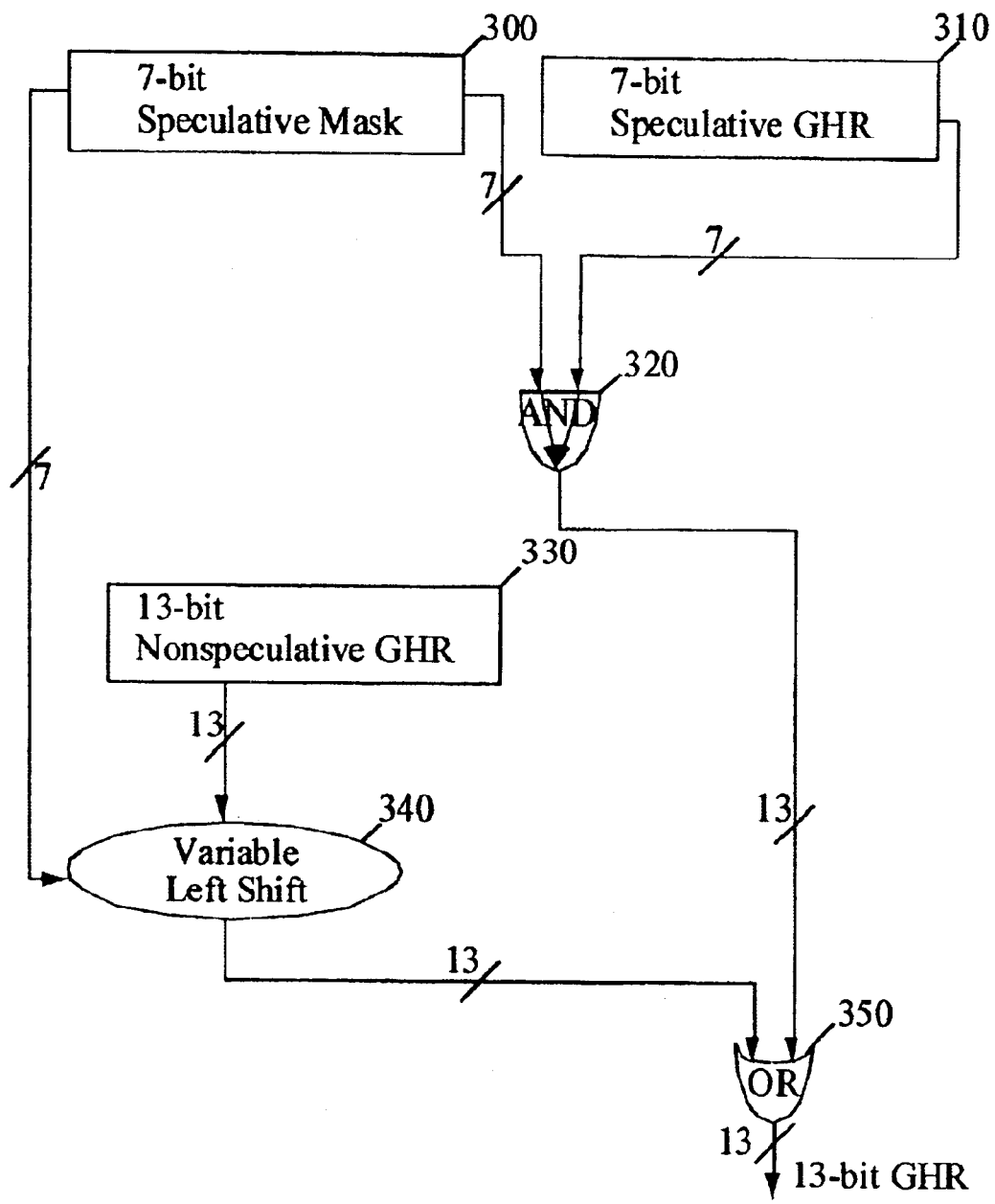
FIG. 3 illustrates selection counter updation when a dynamically predicted branch is resolved.

GHR Updation: There is a delay between the actual resolution of a branch from the time it was predicted. During this delay several more dynamic predictions may be made. The global history, if not updated speculatively, would result in inconsistent indexing of the PHT for these interim predictions which may or may not occur. For improved performance, the global history should be speculatively updated, and FIG. 3 illustrates selection counter updating when a dynamically predicted branch is resolved.

The 1-bit global history 350 is generated from three global history registers: the speculative GHR 310, the non-speculative GHR 330, and the speculative mask 300. It is updated each cycle based on the states of the look-ahead process and branch resolution. The speculative GHR 310 is a binary field whose length is determined by the total number of dynamic predictions that can be made before the branch associated with the earliest dynamic prediction is resolved. For the case being discussed, this length has been set to seven bits. Whenever a dynamic prediction is made as a result of a look-ahead hit, the speculative GHR 310 is shifted by one bit to the left and the rightmost bit is set according to the prediction. If the branch is predicted taken, the bit is set, otherwise the bit is cleared.

The non-speculative GHR 330 is a binary field whose length is 1 bits. In this example, 1 has been set to 13. The non-speculative GHR records the branch resolution history. This is the history of all branches regardless of how they were predicted—either ahead of time using the dynamic hybrid predictor, or at decode time using static prediction. The non-speculative GHR 330 is updated by being shifted one bit to the left and setting the rightmost bit according to the branch resolution.

The speculative mask 300 is used to indicate which positions of the speculative GHR are valid. It is initialized to all 0s. Whenever a dynamic prediction is made and a dynamically predicted branch is not simultaneously resolved, this register is shifted to the left and the rightmost bit is set. The number of set bits determines how many bit positions to left shift 340 the non-speculative GHR 330. This shift operation is done in order to maintain the GHR bits in temporal order of branch resolution. The history for actually resolved branches is placed to the left of the speculative history 310 of the dynamically predicted branches. Whenever a dynamically predicted branch is resolved, the speculative mask 300 is shifted by one bit to the right and the leftmost bit is cleared. The global history generation 350 and updation process described above is unique to the asynchronous look-ahead prediction mechanism used in the example implementation. Speculatively updating history is beneficial in that predicted and resolved branches are treated as separate entities. Recovery from an incorrect dynamic prediction is very simple—the speculative mask 300 must simply be reset to all 0's. This may provide benefit over storing backup copies of the GHR before each speculative update, especially if predictions on several branches can be made before the first of which is resolved.

Figure 4:
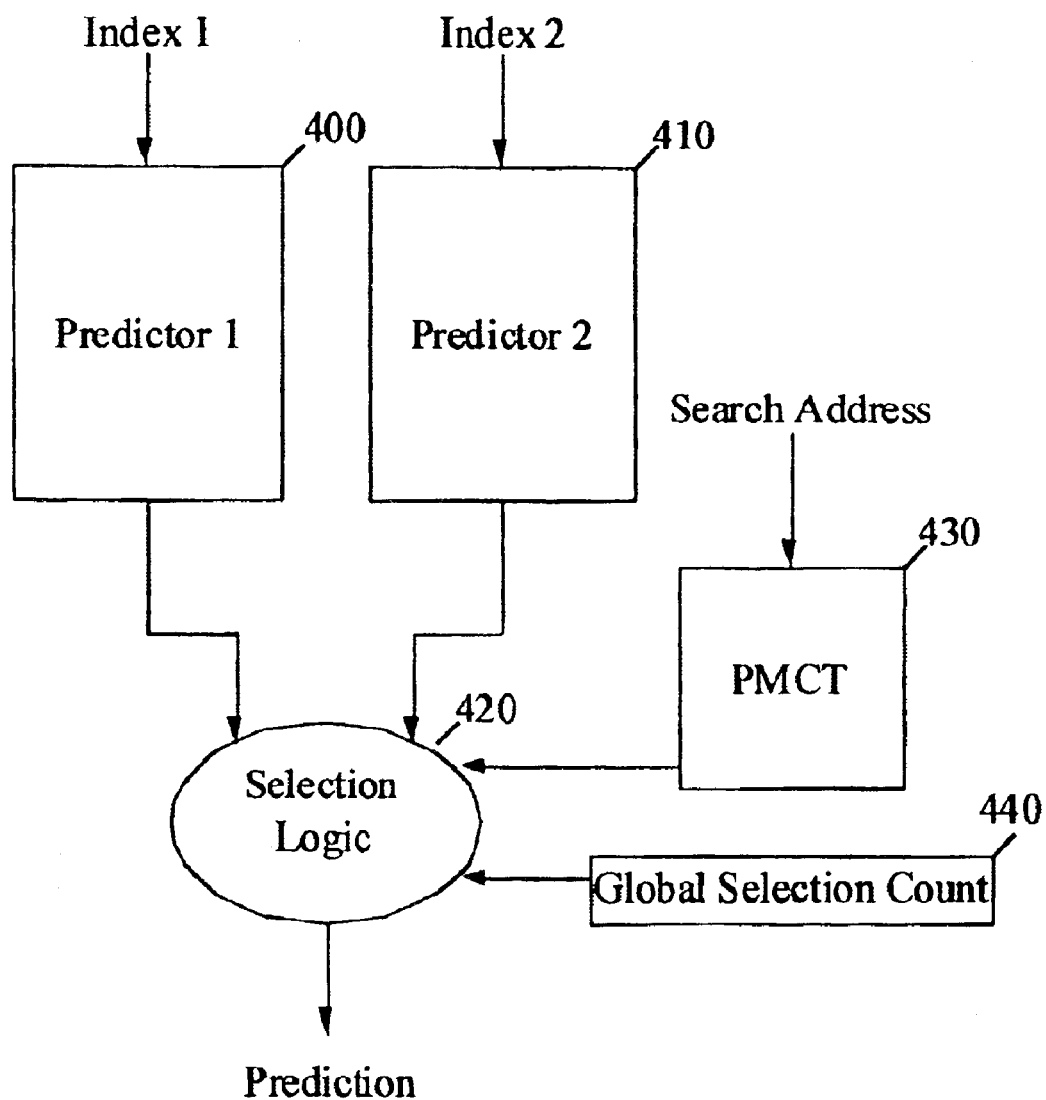
FIG. 4 illustrates PMCT selection control.

Since there are minimal branches which show benefits of one branch predictor over another, and when they do, they occur in particular areas, the method of a global selection counter works very well. With reference to FIG. 4 which illustrates PMCT selection control, we shown that there are instances Where certain branches stick out and there is an advantage to one predictor 400 over another 410. Within the scope of the preferred embodiment, a prediction method comparison table (PMCT) 430 is used in combination with a hybrid branch prediction scheme using a global selection counter 440. When two component predictors are used, the PMCT 430 is useful in improving accuracy of a global selection counter scheme closer to the level obtained from the traditional hybrid schemes without adding back much of the chip area requirement. This method makes it possible to maintain a table that overrides 420 640 650 the predictor selection made by the global comparison counter 440. For the purposes of our invention, we make the use of a table that will be referred to as a Prediction Method Comparison Table (PMCT) 430. It is useful for choosing the correct prediction method 650 for branches that are being consistently guessed wrong due to the global selection counter. This table 430 is indexed by search address 200 which is whatever index is being used to search the BTB 240. Although the same search address 630 is also used to index the BTB, less bits may be used to index the PMCT, therefore the PMCT can be of a much smaller size. Our simulation has shown that a table 430 of 256 2-bit entries is effective in regaining much of the performance loss from replacing a traditional bimodal/gshare hybrid scheme with one using a global selection counter. This can equate to over a ninety percent area reduction. The meaning of each state of a PMCT entry is as follows: State 0 500 describes the bimodal being better once and hence there is no override by the global compare counter. State 1 510 describes the bimodal being better twice in a row and hence causes an override to use the bimodal prediction. State 2 520 describes the gshare being better once and hence there is no override by the global compare counter. State 3 530 describes the gshare being better twice in a row and hence causes an override to use the gshare prediction.

Figure 5:
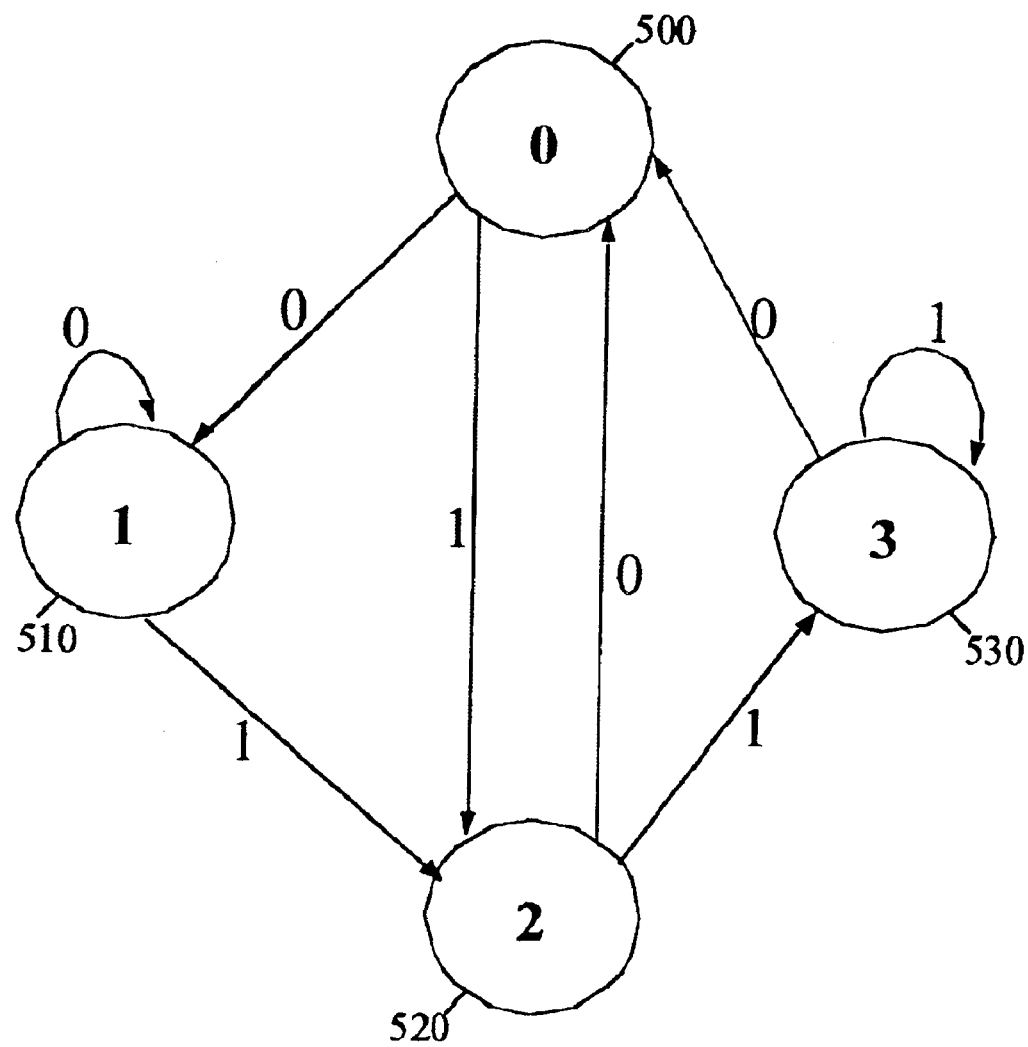

The PMCT 430 entries should be initialized to either state 0 500 or 2 520 to ensure that initially the global selection counter is used. When a dynamically predicted branch is resolved, its PMCT table entry is updated when one method is better than the other according to FIG. 5. If the state is currently 0 500 or 1 510 and the bimodal is better, then the new state becomes state 1 510. If gshare is better, then the new state becomes state 2 520. If the state is currently 2 520 or 3 530 and bimodal is better, then the new state becomes state 0 500. If gshare is better, then the new state becomes state 3 530. Therefore, when a particular method has been better than the other on a particular branch (actually on a branch found by the low-order bits of the search address being used as an index) for two or more consecutive branch resolutions, the previously better method is used to make the prediction on that branch the next time it is found regardless of the state of the global comparison counter at that time. Note that the presence of a PMCT 430 does not change the way in which the global comparison counter is updated. Its only use is to override the global comparison counter's selection among predictors when it is likely to be beneficial to do so.

While the preferred embodiment to the invention has been described, it will be understood that those skilled in the art, both now and in the future, may make various improvements and enhancements which fall within the scope of the claims which follow. For example, those skilled in the art, will understand that other variations of the PMCT are possible. PMCT entries may contain a valid bit, a tag in order to more accurately match the search address, and might only be updated when one method was better than the other and additionally the wrong method was used. So, the claims should be construed to maintain the proper protection for the invention first described.

What is claimed is:

1. A method of predicting branch direction in a microprocessor, comprising the steps of providing branch prediction for a code sequence being executed by said microprocessor by use of one or more branch prediction processes including:

(a) indexing based on the address of the branch, (b) accessing a global history register, (c) selecting between multiple predictors with a global selection counter, and in the process electing a process for predicting a specific branch by use of a prediction method comparison table (PMCT) to override, when appropriate, the global selection counter, wherein there is a global selection counter to select between the different history tables such that a single directional prediction can be made per branch, and said global selection counter has of a defined number of bits which represent the last number of branches equal to the value of two raised to this number of bits, which value increases or decreases towards certain ranges as a given branch predictor outperforms another predictor.

2. The method of predicting branch direction in a microprocessor according to claim 1 wherein the method of prediction utilizes multiple tables used for predicting the direction of a branch and each of said multiple tables is accessed in a different manner in regard to the history pattern stored within the accessed table.

3. The method of predicting branch direction in a microprocessor according to claim 1 wherein there exists a known address of the branch such that said known address of the branch may be referenced for looking up into a history table for a given branch.

4. The method of predicting branch direction in a microprocessor according to claim 1 wherein there exists a global history register storing a direction of the last X branches.

5. The method of predicting branch direction in a microprocessor according to claim 2 wherein said Prediction Method Comparison Table (PMCT) is smaller than the prediction tables such that it can be indexed to thereby allow said global selection counter to be overridden with the prediction method selection stored in the PMCT.

6. The method of predicting branch direction in a microprocessor according to claim 1 wherein the process employs a branch history table (BHT) and a branch table buffer (BTB) each of which can have new entries added in to a given congruence based on the status of the last register used LRU and said entries are added when a branch was not found in the BTB and resolution of execution is reached.

7. The method of predicting branch direction in a microprocessor according to claim 6 wherein an additional and parallal history table PHT is provided which is updated in parallel to that of the BTB and/or BHT.

8. The method of predicting branch direction in a microprocessor according to claim 2, updates to zero, one, or multiple tables are made once a branch has resolved.

9. The method of predicting branch direction in a microprocessor according to claim 4, wherein the last X branches in respect to the code stream of decode are stored in the global history register and a given set of branch history allows for speculative guessing of future branch prediction based on current direction.

10. The method of predicting branch direction in a microprocessor according to claim 4, wherein the last X branches in respect to the code stream of the instructions which have finished execution and the direction of the branch has been resolved are stored in the global history register allowing a speculative global history prediction based on decode to be restored properly in the event of a branch has been made in the wrong direction.

11. The method of predicting branch direction in a microprocessor according to claim 4, further comprising a step of keeping a speculative mask indicating which positions of the speculative global history register are valid.

12. The method of predicting branch direction in a microprocessor according to claim 1, further comprising setting ranges within the global selection counter such that separate ranges determine which history prediction table will be used in selecting the history tot a given branch.

13. The method of predicting branch direction in a microprocessor according to claim 1, wherein multiple global selection counters select among a plurality of hybrid branch prediction processes.

14. The method of predicting branch direction in a microprocessor according to claim 1, wherein said global selection counter is replicated to represent different states of the processor.

15. The method of predicting branch direction in a microprocessor according to claim 1, wherein the method of prediction selected with the use of said prediction method comparison table (PMCT) to override, when appropriate, the global selection counter, determines for a given time frame the best direction prediction method to use.

16. The method of predicting branch direction in a microprocessor according to claim 1, wherein a global selection counter when used in conjunction with said Prediction Method Comparison Table (PMCT) for predicting branch direction on cold starts and context switches in running code.

* * * * *